(12) United States Patent
Smart et al.

(10) Patent No.: US 11,007,926 B1
(45) Date of Patent: May 18, 2021

(54) SMART HEADLIGHTS

(71) Applicant: Arm Limited, Cambridge (GB)

(72) Inventors: George Christopher Smart, Diss (GB); Andrew Robert Gardner, Ely (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/819,480

(22) Filed: Mar. 16, 2020

(51) Int. Cl.
*B60Q 1/14* (2006.01)
*F21S 41/141* (2018.01)
*H05B 45/335* (2020.01)

(52) U.S. Cl.
CPC .......... *B60Q 1/1423* (2013.01); *F21S 41/141* (2018.01); *H05B 45/335* (2020.01)

(58) Field of Classification Search
CPC .............. B60Q 1/1423; B60Q 2300/05; B60Q 2300/47; H05B 45/30; H05B 45/32; H05B 45/335; H04B 10/11; H04B 10/112; H04B 10/113; H04B 10/1123; H04B 10/116; H04B 1/38; H04B 1/3822
See application file for complete search history.

(56) References Cited

U.S. PATENT DOCUMENTS

| | | | | |
|---|---|---|---|---|
| 6,049,171 A * | 4/2000 | Stam | ................. | G06K 9/00825 315/82 |
| 6,542,270 B2 | 4/2003 | Perkins et al. | | |
| 2005/0137782 A1* | 6/2005 | Shinada | ............... | G08G 1/0965 701/117 |
| 2009/0072996 A1* | 3/2009 | Schoepp | ............... | G01S 7/4814 340/903 |
| 2010/0271617 A1* | 10/2010 | Damink | ................. | G01S 17/36 356/5.09 |
| 2013/0271747 A1* | 10/2013 | Roberts | .................. | G01S 17/42 356/5.01 |
| 2014/0025284 A1* | 1/2014 | Roberts | .................. | G08G 1/163 701/300 |
| 2014/0099107 A1* | 4/2014 | Ravich | ................. | H04B 10/116 398/43 |
| 2014/0347648 A1* | 11/2014 | Roberts | .................. | G01S 17/06 356/4.01 |
| 2015/0016824 A1* | 1/2015 | Roberts | ............. | H04B 10/1129 398/118 |
| 2015/0048738 A1* | 2/2015 | Falb | .................... | G06K 9/00825 315/82 |

(Continued)

OTHER PUBLICATIONS

Cavanagh et al., "Efficient Pulse Width Modulation LED Headlight Driver," https://digitalcommons.wpi.edu/mqp-all/1221/, Apr. 30, 2015.

(Continued)

*Primary Examiner* — Jason Crawford
(74) *Attorney, Agent, or Firm* — Leveque Intellectual Property Law, P.C.

(57) ABSTRACT

An apparatus and method for controlling a headlight. The apparatus has a first light sensor at a first portion of a vehicle and a system controller. The system controller is operatively coupled to the first light sensor and configured to adjust a state of the headlight based at least in part on a first light detection notification that indicates whether light has been received by the first light sensor and a first identifying signal notification that indicates whether received light is modulated and if modulated the presence of one or more identifying signals.

6 Claims, 11 Drawing Sheets

(56) References Cited

U.S. PATENT DOCUMENTS

| | | | |
|---|---|---|---|
| 2016/0019729 A1* | 1/2016 | Rufo Torres | H01Q 1/2208 |
| | | | 701/31.5 |
| 2016/0189146 A1* | 6/2016 | Cattone | H04B 10/1143 |
| | | | 705/71 |
| 2018/0339645 A1* | 11/2018 | Ekkizogloy | F21S 41/00 |
| 2019/0074901 A1* | 3/2019 | Bermak | H04B 10/532 |
| 2019/0097722 A1* | 3/2019 | McLaurin | H04B 10/116 |
| 2020/0280829 A1* | 9/2020 | Benefield | H04B 10/1143 |

OTHER PUBLICATIONS www.cree.com, "Pulsed Over-Current Driving of Cree® XLamp® LEDs: Information and Cautions," Application Note CLD-AP60 Rev 1F, downloaded from the internet on Mar. 11, 2020.

* cited by examiner

SMART HEADLIGHTS

BACKGROUND

Vehicle systems that automate some portion of the driver's duties are increasing in popularity. One such duty is control of headlight state, e.g., high beams and low beams, at night, especially in low-traffic rural areas when high beams are most useful. An improved vehicular headlight control system and methodology is desired.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A "module" as used herein describes a component or part of a program or device that can contain hardware or software, or a combination of hardware and software. In a module that includes software, the software may contain one or more routines, or subroutines. One or more modules can make up a program and/or device.

One problem with existing vehicular headlight control systems is that they cannot distinguish between the light from oncoming traffic headlights, and reflected light from a vehicle's own headlights—for example, from a reflective road sign. This causes undesired behavior, e.g., the transition from a high beam state to a low beam state, as the vehicle approaches the road sign.

An improvement results when light from the vehicle's light-emitting diode (LED) headlights includes an identifying signal containing an identification value, e.g., a vehicle ID, and the headlight control system contains a sensor detector mechanism to determine the identifying signal(s) (or vehicle ID(s)) present in received light. This enables the system to distinguish between the light from oncoming traffic headlights, and reflected light from the vehicle's own headlights, so the undesired behavior can be avoided.

Figure 1:
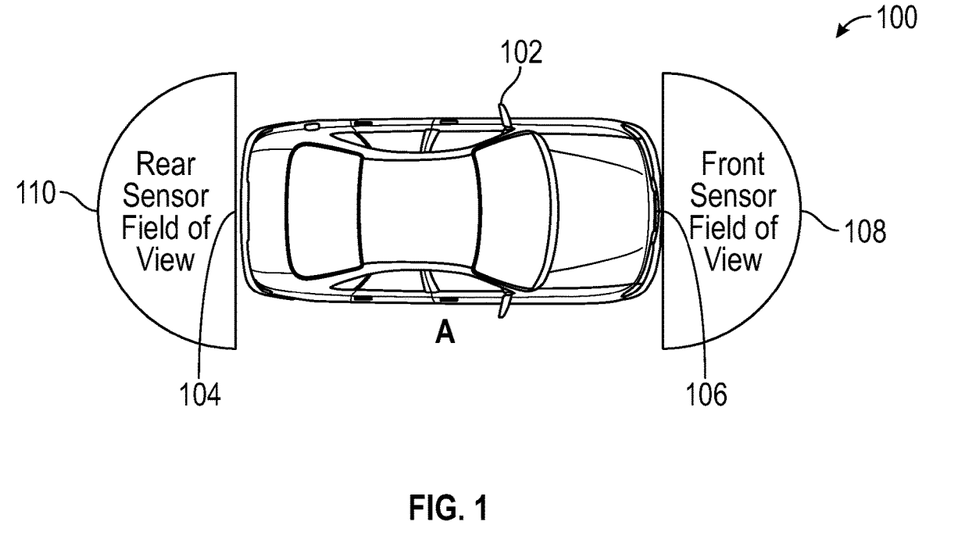
FIG. 1 illustrates a vehicle, in accordance with an embodiment.

FIG. 1 shows a system 100 according to an embodiment. In this embodiment, vehicle 102 has front sensor 106 with front sensor field of view 108, and rear sensor 104 with rear sensor field of view 110. In an example embodiment, front sensor field of view 108 and rear sensor field of view 110 are each 180 degrees in azimuth, but other values are also useful.

Figure 2:
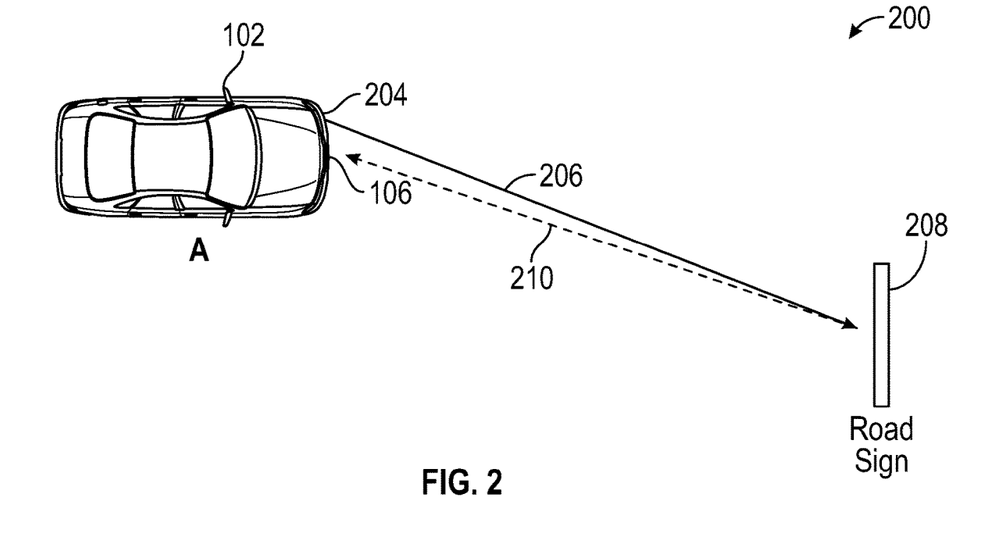
FIG. 2 illustrates a single-vehicle operation scenario, in accordance with an embodiment.

As shown in FIG. 2, in a single-vehicle operation scenario 200, vehicle 102 is present alone on a road. Headlight 204 of vehicle 102, a headlight having an LED source, in a high beam state, shines modulated light 206, which is reflected by road sign 208 producing reflected light 210 which is detected by front sensor 106. In single-vehicle operation scenario 200, the light detected by front sensor 106 is only light reflected by the car's surrounding environment within front sensor field of view 108 (e.g., road sign 208). In this example, there is no unmodulated light present, and the identifying signal (i.e., a signal with an identification value, e.g., a vehicle ID, encoded within) detected by front sensor 106 is that of vehicle 102 itself, from reflected light 210. Advantageously, in this scenario headlight 204 remains in a high beam state, in contrast to, e.g., a light intensity-based solution, which may result in the headlight beam changing state unnecessarily.

Figure 3:
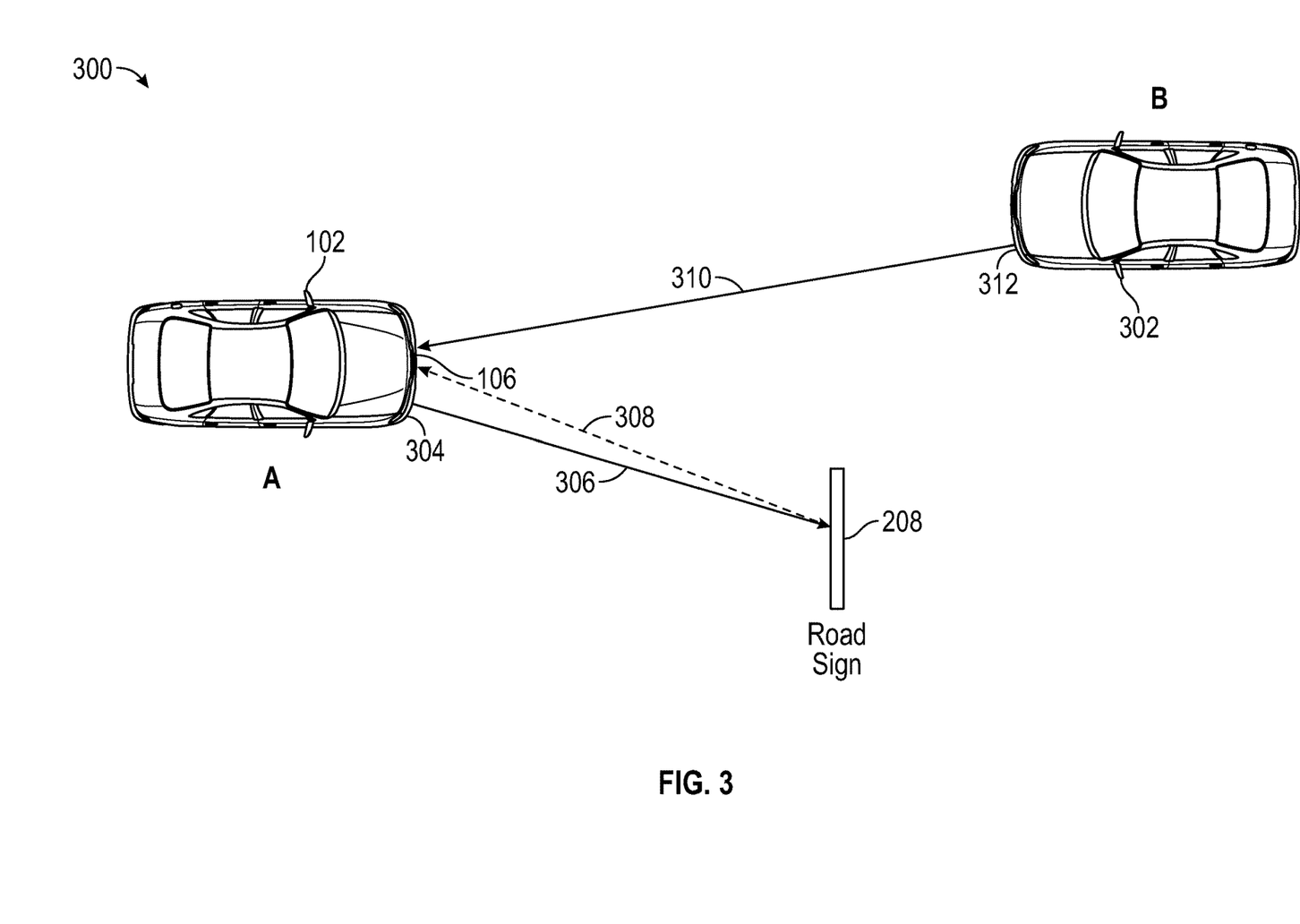
FIG. 3 illustrates a two-vehicle, oncoming-traffic operation scenario, in accordance with an embodiment.

In two-vehicle, oncoming-traffic operation scenario 300, as shown in FIG. 3, oncoming vehicle 302 is present on a road with vehicle 102. Headlight 304 of vehicle 102, in a high beam state, shines modulated light 306 containing an identifying signal (i.e., a signal with an identification value, e.g., a vehicle ID, encoded within), which is reflected by road sign 208 producing reflected light 308 which is detected by front sensor 106. Further, headlight 312 of oncoming vehicle 302 shines light 310, which is also detected by front sensor 106. If it is determined at vehicle 102 that light 310 is unmodulated, i.e., it has no vehicle ID encoded, or if light 310 is modulated, but with a vehicle ID different from that of vehicle 102, headlight 304 will change to a second state, a low beam state, changing at least one of an amplitude, direction, and shape of the headlight beam. Otherwise, headlight 304 will remain in a high beam state.

Figure 4:
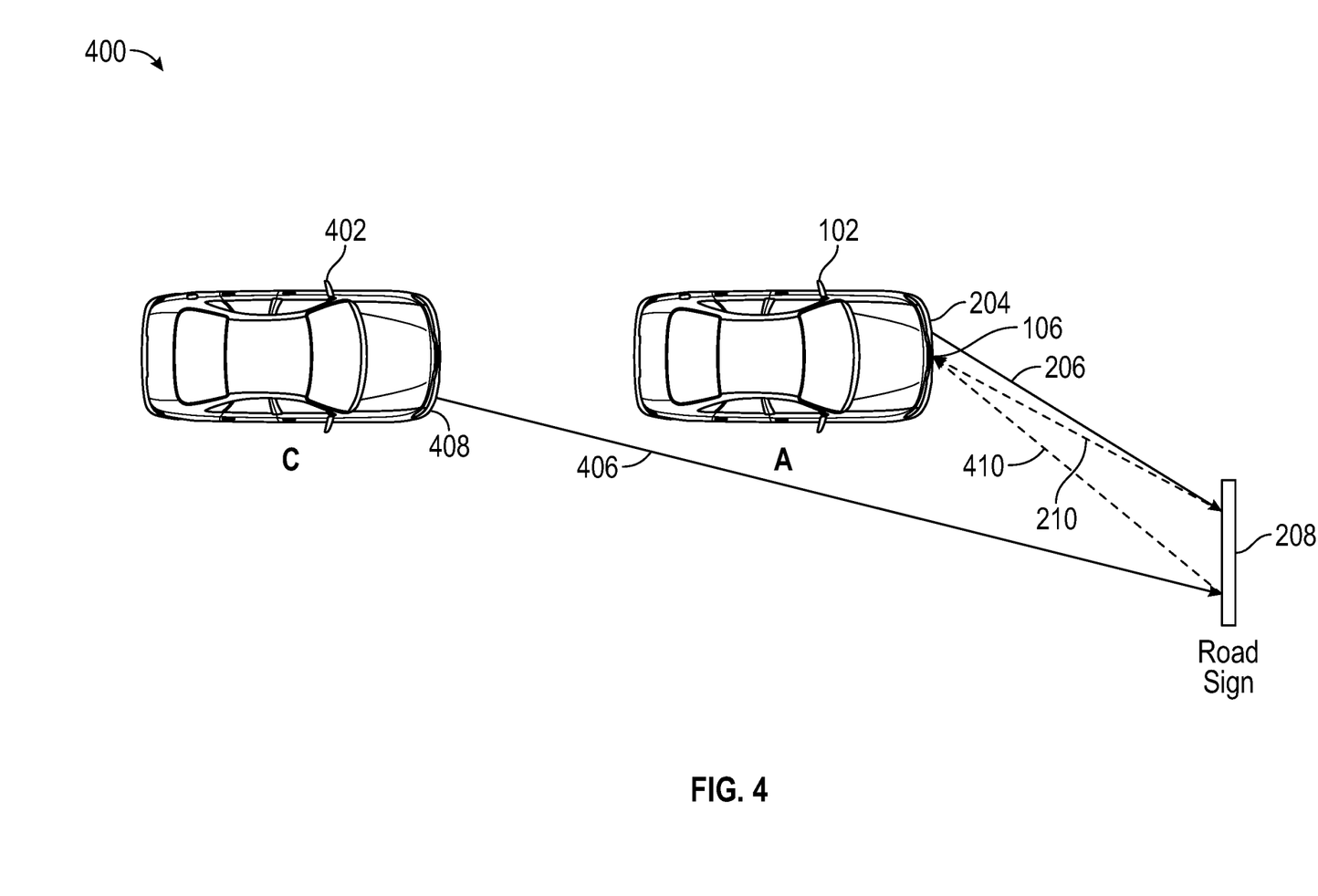
FIG. 4 illustrates a first two-vehicle, following-traffic operation scenario, in accordance with an embodiment.

In first two-vehicle, following-traffic operation scenario 400, as shown in FIG. 4, following vehicle 402 is behind vehicle 102. Headlight 204 of vehicle 102, in a high beam state, shines modulated light 206, which is reflected by road sign 208 producing reflected light 210 which is detected by front sensor 106. Further, headlight 408 of following vehicle 402 shines light 406, which is reflected by road sign 208 producing reflected light 410 also detected by front sensor 106. If light 410 is unmodulated, i.e., it has no vehicle ID encoded in an identifying signal, headlight 204 will change to a second state, a low beam state, changing at least one of an amplitude, direction, and shape of a headlight beam, and will shine unmodulated light.

Figure 5:
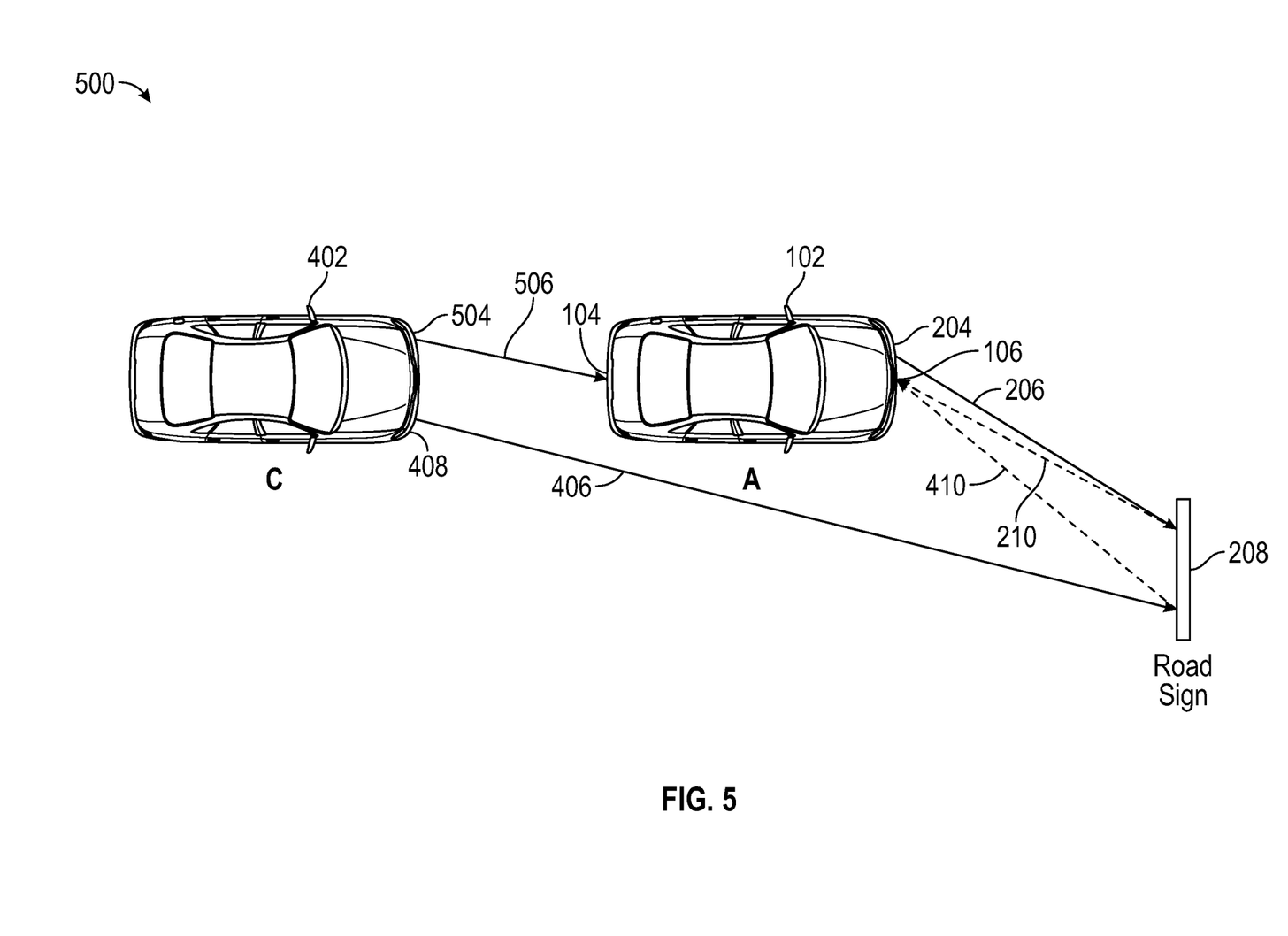
FIG. 5 illustrates a second two-vehicle, following-traffic operation scenario, in accordance with an embodiment.

In second two-vehicle, following-traffic operation scenario 500, as shown in FIG. 5, light 410 is modulated, but with an identifying signal differing from that of vehicle 102. Headlight 504 of vehicle 402 will shine modulated light 506 detected by rear sensor 104, as headlight 504 is within rear sensor field of view 110. Thus, independent of the identifying signal of vehicle 102, the identifying signals detected by front sensor 106 and rear sensor 104 will be the same: Each identifying signal present in the light detected by front sensor 106 is present in the light detected by rear sensor 104, and each identifying signal present in the light detected by rear sensor 104 is present in the light detected by front sensor 106. Under this condition, headlight 204 of vehicle 102 will remain in a high beam state.

Figure 6:
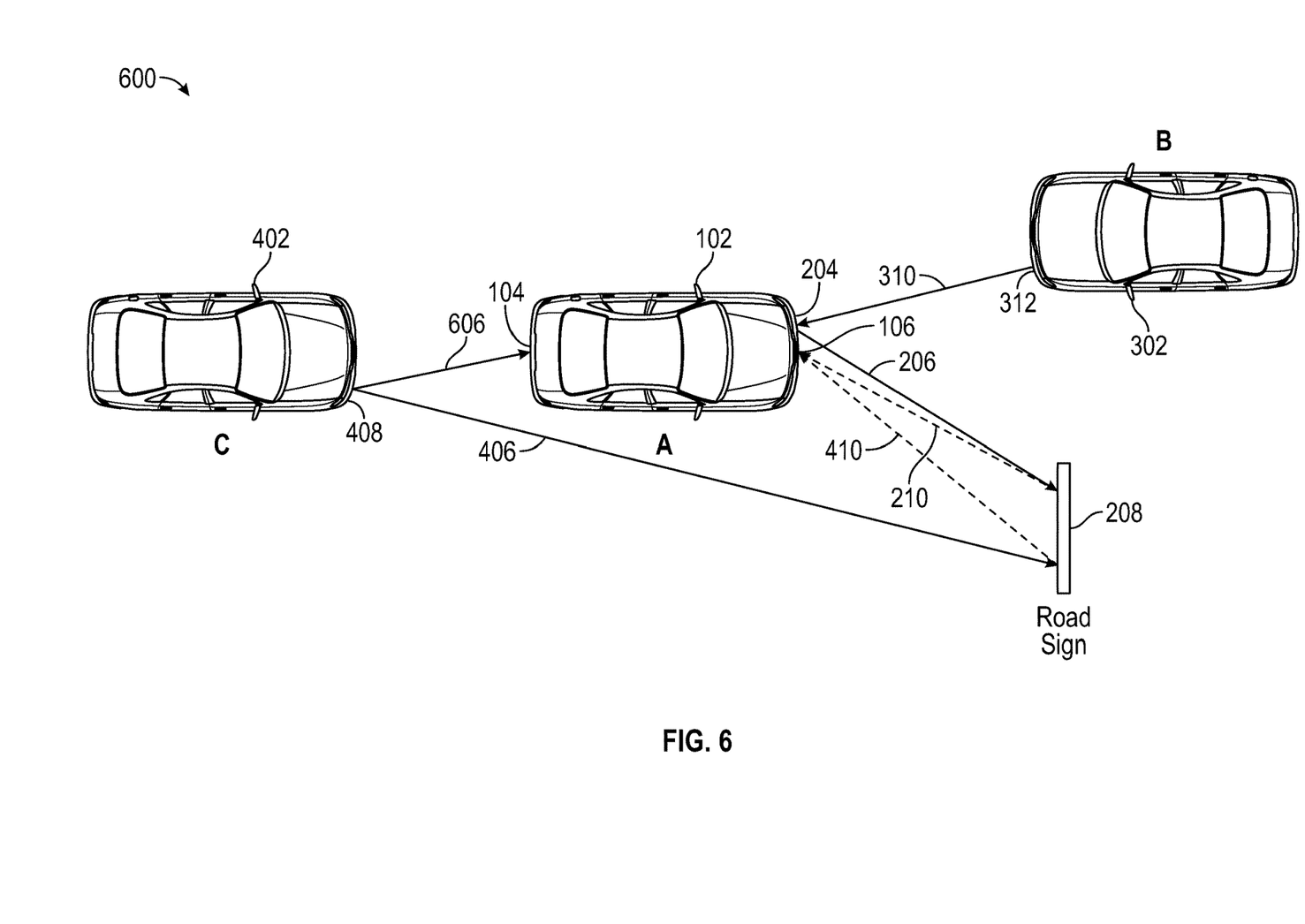
FIG. 6 illustrates a three-vehicle, oncoming- and following-traffic operation scenario, in accordance with an embodiment.

In three-vehicle, oncoming- and following-traffic operation scenario 600, as shown in FIG. 6, both following vehicle 402 and oncoming vehicle 302 are present with vehicle 102. Headlight 204 of vehicle 102, in a high beam state, shines modulated light 206, which is reflected by road sign 208 producing reflected light 210 which is detected by front sensor 106. Further, headlight 408 of following vehicle 402 shines light 406, which is reflected by road sign 208 producing reflected light 410 also detected by front sensor 106 of vehicle 102. Headlight 408 also shines light 606, which is detected by rear sensor 104 of vehicle 102. Headlight 312 of oncoming vehicle 302 shines light 310, which is detected by front sensor 106 of vehicle 102. Whether or not light 310 is modulated, headlight 204 will change to a second state, a low beam state, changing at least one of an amplitude, direction, and shape of a headlight beam.

In addition to the occurrence of changing at least one of amplitude, direction and shape, in the context of changing state between high and low beams, other embodiments contemplate adaptive beam forming in which the optics are adjusted and/or rotated to maintain a dark region around incoming vehicles, such that their driver(s) are not dazzled.

When using LEDs in vehicle headlights, there is a possibility to turn them off and on at high speeds, such that the momentary absence of light is not noticeable due to the persistence of human vision. This is not possible with older technologies, such as incandescent filament bulbs, due to thermal lag.

When the unique vehicle ID is modulated onto the light source, care must be taken to ensure that the intensity of the light is not affected by the modulation. To prevent a noticeable reduction in the intensity of the light emitted, the duration of time that the lights are off must be kept short. The momentary powering-off of the lights can be repeated periodically. The percentage of time the lights spend on during the repeat period defines a duty cycle.

The repetition period, in effect, becomes a carrier frequency, allowing information to be modulated onto it. By keeping this carrier frequency in the low tens of kilohertz, inexpensive hardware can be used both in terms of switching transistors in the LED modulator and analogue-to-digital converters in the receiver. This frequency can be randomly varied to reduce the chances of overlapping signals in the frequency domain.

The system only needs to be able to cope with relatively small numbers of vehicle IDs. Scenarios with tens of vehicle IDs present tend to be in busy environments, and, it is acceptable for the vehicle to have the headlights in a low-beam state in such cases. In an example embodiment or embodiments, the identifying signal may equally be based on a vehicle's registration number, vehicle chassis number, or any other identifying number as is seen appropriate. Such an identification value would be unique among the received vehicle IDs.

Figure 7:
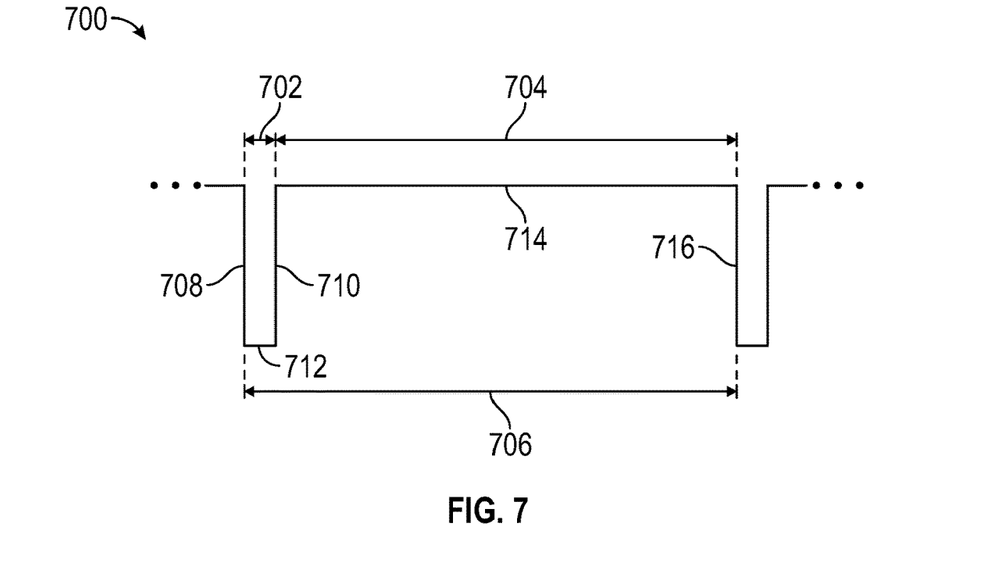
FIG. 7 illustrates a high duty-cycle square wave, in accordance with an embodiment.

A 10 kHz carrier, for example, implies a waveform repetition period of 100 μs. In order to maintain a high duty cycle, such as 95%, the carrier is a square wave spending 95% of time at a logic high. Thus, of the 100 μs period, 5 μs is spent in the low state and 95 μs in the high state. Such a square wave 700 is shown in FIG. 7, with low state duration 702 and high state duration 704 summing to repetition period 706. The waveform begins with falling transition 708 from a high state to a low state, followed by low state period 712, rising transition 710, and high state period 714. A repetition of the wave begins with next falling transition 716.

Those of ordinary skill in the art will recognize that many types of modulation may be employed using square wave 700 as a carrier wave.

Figure 8:
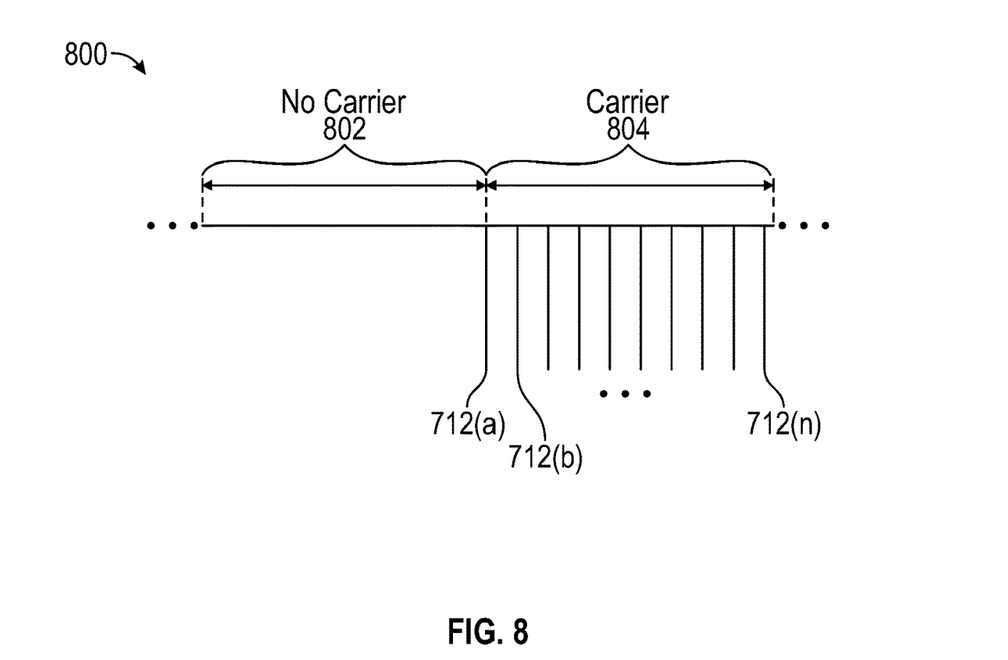
FIG. 8 illustrates a modulated "1" bit, in accordance with an embodiment.

One embodiment uses square wave 700 as a carrier wave, and a simple modulation scheme for sending either a binary 1 or binary 0. On-off keying (OOK) is used to modulate the vehicle ID onto the light. As shown in FIG. 8, a binary 1 is represented by not transmitting carrier for a time (no carrier period 802), followed by transmitting carrier for a time (carrier period 804). In one embodiment, the durations of no carrier period 802 and carrier period 804 are each one millisecond. Low state periods 712(1), 712(2), . . . , 712(n), where "n" is any suitable number, are indicated in FIG. 8, as portions of repeated square wave 700.

Figure 9:
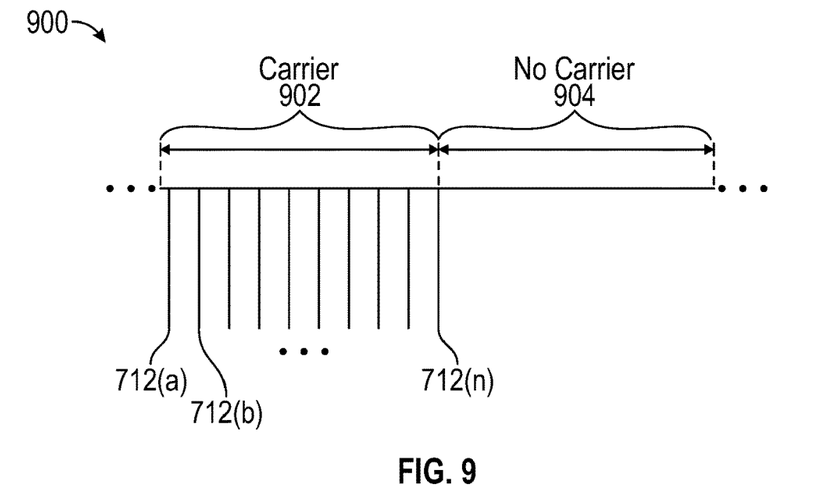
FIG. 9 illustrates a modulated "0" bit, in accordance with an embodiment.

As shown in FIG. 9, a binary 0 is represented by transmitting carrier for a time (carrier period 902), followed by not transmitting carrier for a time (no carrier period 904). In one embodiment, the durations of carrier period 902 and no carrier period 904 are each one millisecond. Low state periods 712(1), 712(2), . . . , 712(n), where "n" is any suitable number, are indicated in FIG. 9, as portions of repeated square wave 700.

In these embodiments, each bit period is 2 milliseconds, split equally between carrier on and carrier off. The duration of the bit period may be any suitable value, but a lower limit of the bit period is the time required for at least one complete carrier wave, square wave 700, to be placed in each of carrier period 804 and carrier period 902. An upper limit of the bit period is determined at least by the maximum time available to transmit the desired data, and by the need to be imperceptible to the human eye.

Other modulation methods, including m-ary frequency-shift keying (FSK), where "m" is any suitable number, are also contemplated. The data may be sent directly or combined with a pseudo-random synchronization vector—a known pattern that the receiver can search for and correlate with—to improve decoding reliability.

In some embodiments, the data-stream to be modulated includes a validity check such as parity check or a simple checksum. This allows the system to differentiate between modulated light sources and randomly flickering lights, such as with mains frequency ripple or from switching power supplies. Other embodiments add forward error correction to recover from receiving errors. Still other embodiments add a pseudo-random synchronization vector to help the sensor detector mechanism to synchronize.

Figure 10:
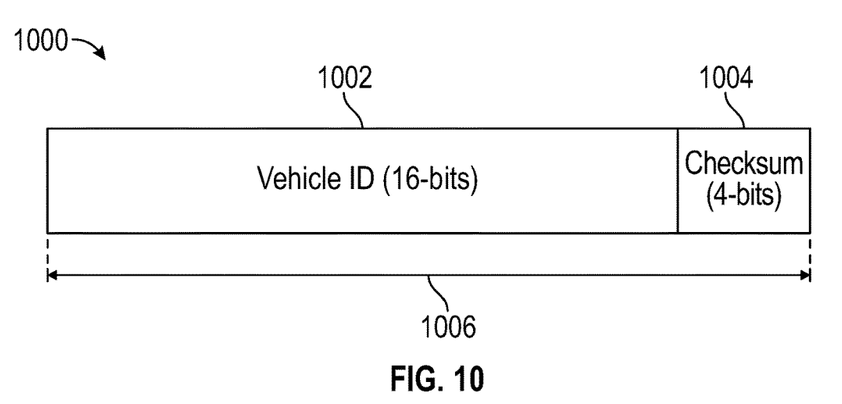
FIG. 10 illustrates a data frame, in accordance with an embodiment.

In the example embodiment shown in FIG. 10, a 4-bit checksum 1004 is added to randomly generated 16-bit vehicle ID 1002, to make data frame 1000 having a total payload length 1006 of 20 bits.

Figure 11:
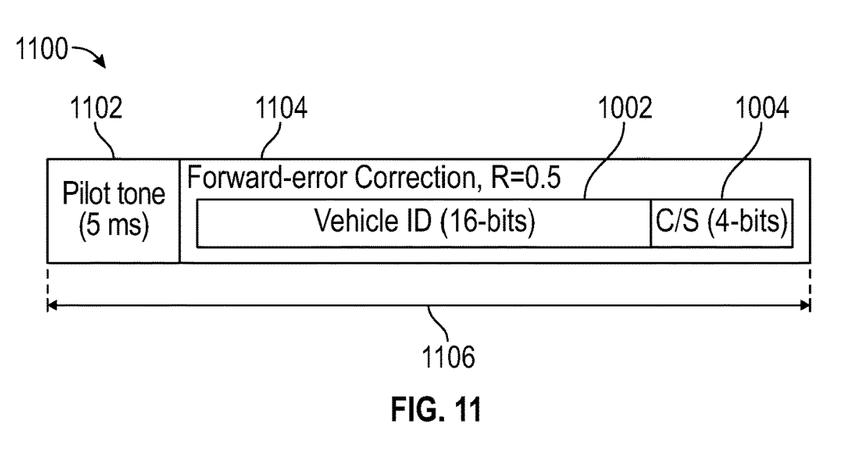
FIG. 11 illustrates an FEC-encoded frame, in accordance with an embodiment.

In another example embodiment, shown in FIG. 11, rate 1/2 (R=1/2) forward error correction (FEC) has been applied to data frame 1000 (containing vehicle ID 1002 and checksum 1004). This application creates FEC-encoded payload 1104 having a length of 40 bits, while increasing the chance of successfully decoding data frame 1000. With a bit duration of 2 ms, it will take 80 ms to send FEC-encoded payload 1104. Pilot tone 1102, of 5 ms duration, is added as a preamble for the sequence, creating FEC-encoded frame 1100 and increasing FEC-encoded frame duration 1106 to 85 ms.

Other types of forward error correction, for example, codes having a rate differing from 1/2, convolutional codes, block codes and low-density parity check (LDPC) codes, are also contemplated, as are other error-reduction techniques, such as the use of interleaving to reduce susceptibility to burst errors.

It can be understood that the embodiments presented herein provide a way to use vehicle headlights as a way of sending low-rate data with data being encoded at a low rate. The data payload of the lights can include speed and direction information of vehicles or any other relevant data.

Figure 12:
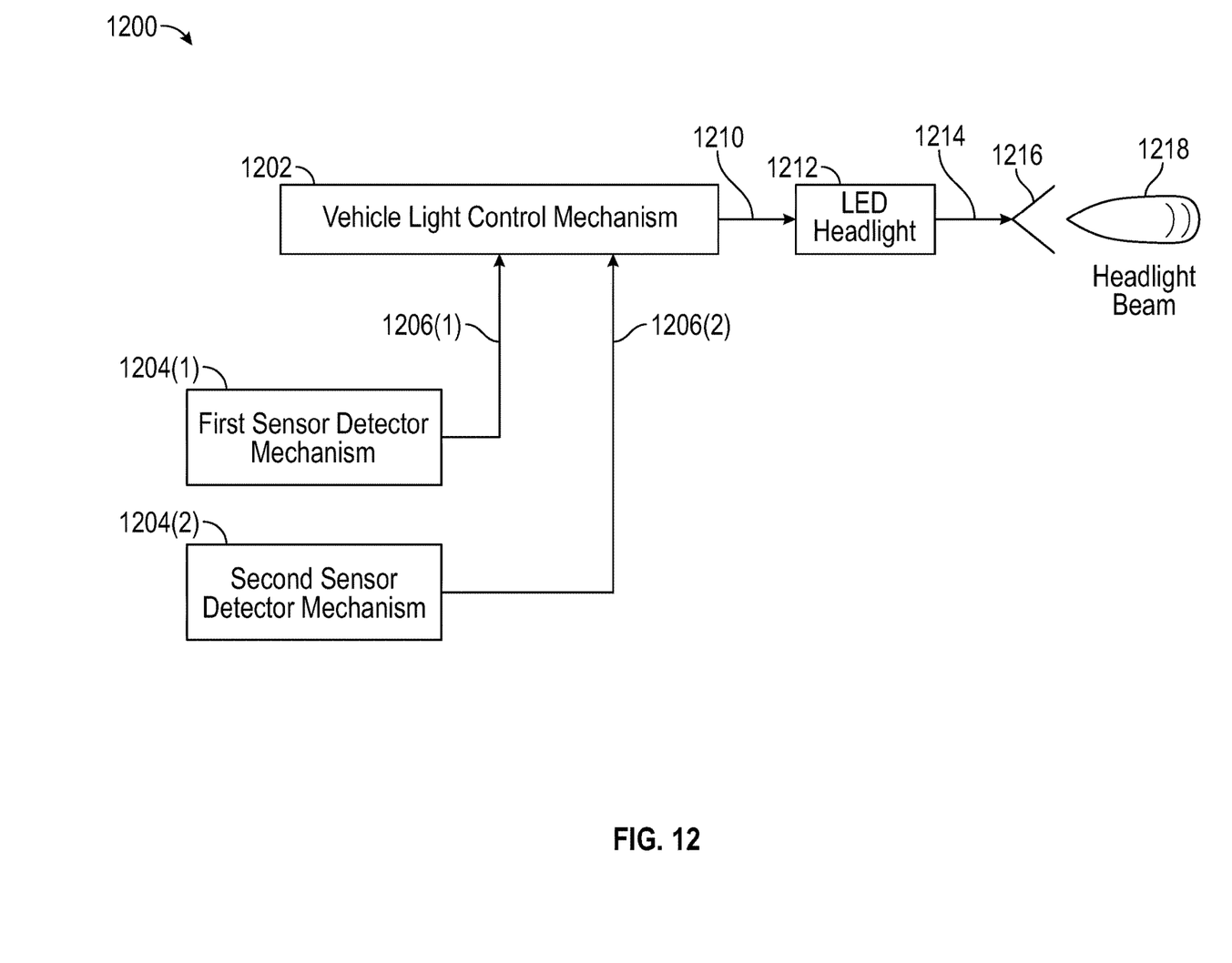
FIG. 12 illustrates an apparatus, in accordance with an embodiment.

An embodiment, shown in FIG. 12, comprises the Vehicle Light Control Mechanism (VLCM) 1202, First Sensor Detector Mechanism (FSDM) 1204(1), and Second Sensor Detector Mechanism (SSDM) 1204(2). FSDM 1204(1) is coupled to VLCM 1202 via FSDM output signal 1206(1), which contains a first light detection notification and a first identifying signal notification. The first light detection notification reports that light has been received by FSDM 1204(1), and the first identifying signal notification reports whether or not the light is modulated and, if modulated, the one or more identifying signals present. In an alternative embodiment, the first identifying signal notification reports whether or not the light is modulated and, if modulated, the one or more identification values (e.g., vehicle ID 1002) indicated by the one or more received identifying signals present. Similarly, SSDM 1204(2) is coupled to VLCM 1202 via SSDM output signal 1206(2), which contains a second light detection notification and a second identifying signal notification. The second light detection notification reports that light has been received by SSDM 1204(2), and the second identifying signal notification reports whether or not said light is modulated and, if modulated, the one or more identifying signals present. In an alternative embodiment, the second identifying signal notification reports whether or not said light is modulated and, if modulated, the one or more identification values (e.g., vehicle ID 1002) indicated by the one or more received identifying signals.

VLCM 1202 is coupled to LED headlight 1212 via VLCM output signal 1210, and LED headlight 1212 is coupled to headlight lens 1216 via outgoing light 1214. Headlight lens 1216 then produces headlight beam 1218, which may contain modulated or unmodulated light.

It can be understood from FIG. 12 that vehicle light control mechanism 1202 need not utilize identifying signals that are randomly generated, as will be explained in connection with the embodiment of FIG. 13, for example. As previously set forth, the identifying signal may instead be based on a vehicle's registration number, vehicle chassis number, or any other identifying number as is seen appropriate. Such an identification value would be unique among the received vehicle IDs. At least in such cases, a system controller 1316 coupled to first sensor detector mechanism 1204(1) is configured to adjust a state of the headlight based at least in part on a first light detection notification that indicates whether light has been received by the first light sensor and a first identifying signal notification that indicates whether received light is modulated and, if modulated, the presence of one or more identifying signals.

Figure 13:
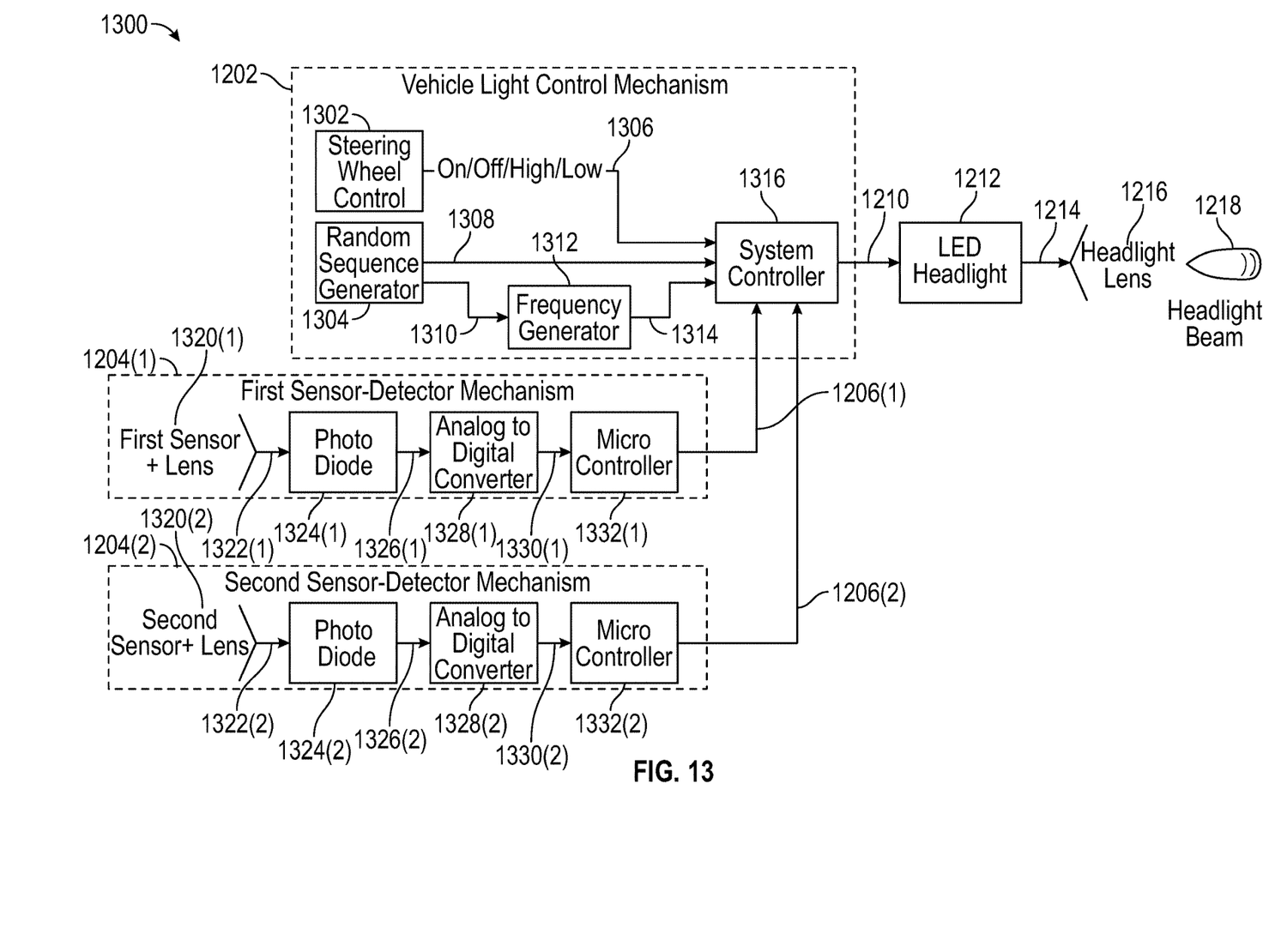
FIG. 13 illustrates an apparatus, in accordance with another embodiment.

As shown in FIG. 13, in VLCM 1202 steering wheel control 1302 produces command signal 1306 coupled to system controller 1316. Random sequence generator 1304 produces first output signal 1308 coupled to system controller 1316 and second output signal 1310 coupled to frequency generator 1312. Frequency generator 1312 produces frequency signal 1314 coupled to system controller 1316. System controller 1316 is coupled to FSDM 1204(1) via FSDM output signal 1206(1) and to SSDM 1204(2) via SSDM output signal 1206(2), and produces VLCM output signal 1210 coupled to LED headlight 1226.

In FSDM 1204(1), first incoming light 1322(1) from first sensor and lens 1320(1) is coupled to first photodiode 1324(1). First output electrical signal 1326(1) from first photodiode 1324(1) is coupled to first analog-to-digital converter (ADC) 1328(1), which is coupled to first microcontroller 1332(1) via first ADC output signal 1330(1). First microcontroller 1332(1) is coupled to system controller 1316 in VLCM 1202 via FSDM output signal 1206(1).

In SSDM 1204(2), second incoming light 1322(2) from second sensor and lens 1320(2) is coupled to second photodiode 1324(2). Second output electrical signal 1326(2) from second photodiode 1324(2) is coupled to second ADC 1326(2), which is coupled to second microcontroller 1332(2) via second ADC output signal 1330(2). Second microcontroller 1332(2) is coupled to system controller 1316 in VLCM 1202 via SSDM output signal 1206(2).

Figure 14:
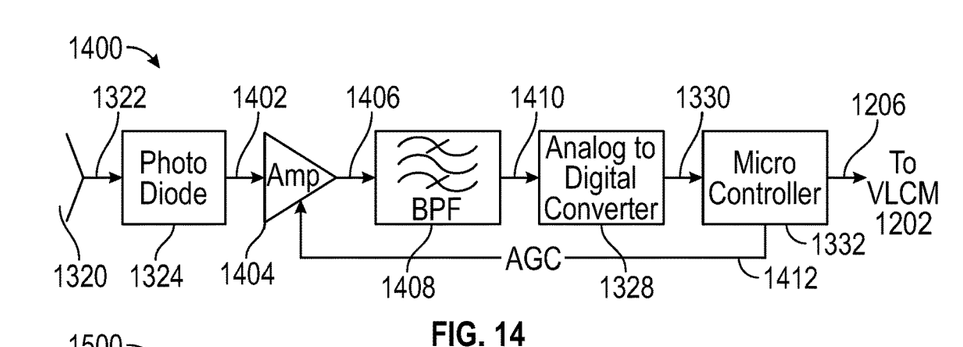
FIG. 14 illustrates a generic sensor detector mechanism, in accordance with an embodiment.

A more detailed presentation of an example sensor detector mechanism (SDM) embodiment is shown in FIG. 14. Incoming light 1322 from sensor and lens 1320 is coupled to photodiode 1324. To improve sensitivity, output electrical signal 1402 from photodiode 1324 is coupled to amplifier 1404. To further reject noise, and to help differentiate between modulated light sources and undesired signals (such as those of flickering lights), amplifier output 1406 is coupled to bandpass filter 1408. Bandpass filter output signal 1410 is then coupled to microcontroller 1332 via ADC 1328 and ADC output signal 1330.

To maintain an amplitude of an input of ADC 1328 in a suitable operating range, microcontroller 1332 additionally sources automatic gain control (AGC) signal 1412, which is fed back to amplifier 1404 and is used to control the gain of amplifier 1404.

Returning to FIG. 13, first sensor and lens 1320(1) is placed at a first portion of a vehicle and second sensor and lens 1320(2) is placed at a second portion of the vehicle. The first portion of the vehicle may, for example, be a front portion of the vehicle and the second portion of the vehicle may, for example, be a rear portion of the vehicle. The vehicle may be a motor vehicle or a vehicle propelled by muscular power, and may further comprise one of an automobile, bicycle, bus, carriage, moped, motorcycle, recreational vehicle, tractor, truck, van, and wagon.

In an embodiment, a first random sequence is generated by random sequence generator 1304 (e.g., each time the vehicle is unlocked or started) in VLCM 1202, and is coupled via first output signal 1308 to system controller 1316. A second random sequence is coupled to frequency generator 1312 via second output signal 1310. Frequency generator 1312 uses the second random sequence to generate square wave 700, which is then coupled to system controller 1316 via frequency signal 1314 to be used as a carrier having a randomized frequency. Randomizing the carrier frequency may simplify the detection process in environments where multiple modulated light signals are present.

Random sequence generator 1304 may generate the first random sequence and the second random sequence based at least in part on at least one of a truly random sequence, e.g., a sequence derived from quantum physical phenomena, and a pseudorandom sequence, e.g., a sequence derived from linear-feedback shift register techniques.

At system controller 1316, the first random sequence is used to generate identification value vehicle ID 1002 and FEC-encoded frame 1100. Also at system controller 1316, FEC-encoded frame 1100 modulates square wave 700, producing VLCM output signal 1210, which is coupled onto headlight beam 1218 via LED headlight 1212, outgoing light 1214, and headlight lens 1216. A 16-bit first random sequence, for example, may be used to generate vehicle ID 1002, as this gives such a large number (>65 thousand) of possible combinations that the chance of having two vehicles with the same vehicle ID 1002 in close proximity is small.

A second random sequence is generated by random sequence generator 1304 and coupled via second output signal 1310 to frequency generator 1312, where it is used to randomize the frequency of frequency signal 1314, coupled to system controller 1316. System controller 1316 uses frequency signal 1314 to randomize the frequency of the carrier, square wave 700. Randomizing the carrier frequency may simplify the detection process in environments where multiple modulated light signals are present.

Also in VLCM 1202, system controller 1316 responds to driver headlight state commands (e.g., Off, High beam active, Low beam active, etc.) received via command signal 1306 from steering wheel control 1302, by adjusting VLCM output signal 1210 accordingly. Further, system controller 1316 receives incoming light detection notifications and identifying signal notifications, reporting detection of light, the light type (i.e., modulated with an identification value encoded, or not) as well as the identifying signal(s) and/or identification value(s), from microcontroller 1332(1) at FSDM 1204(1) via FSDM output signal 1206(1) and from microcontroller 1332(2) at SSDM 1204(2) via SSDM output signal 1206(2).

Figure 15:
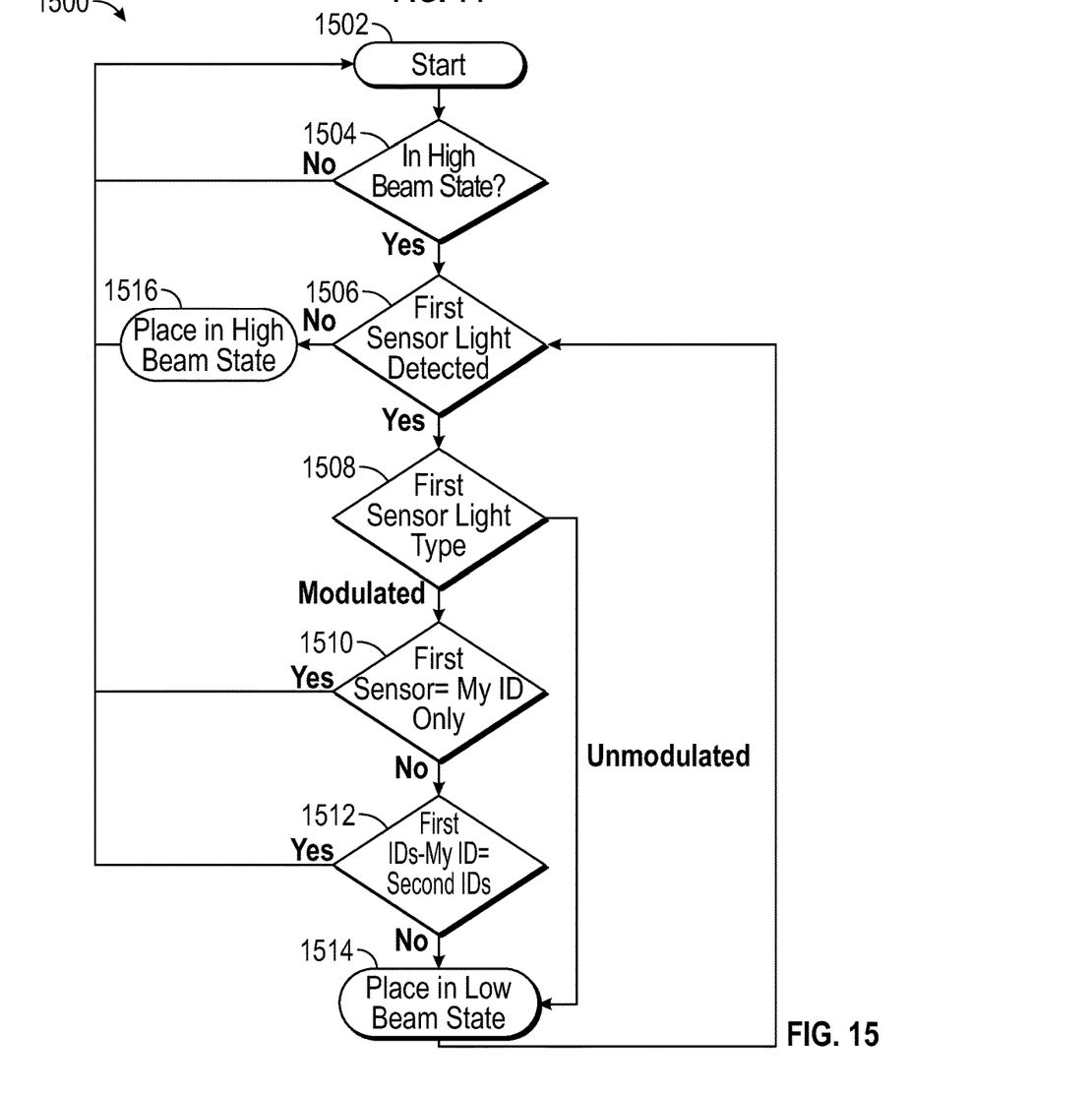
FIG. 15 illustrates a flowchart according to an embodiment.

FIG. 15 shows a flowchart 1500 according to an embodiment. The algorithm 1500 begins (1502).

A determination is made whether a headlight is in a high beam state (1504). If not, the algorithm begins (1502). The headlight was described herein in relation to FIG. 13 as headlight 204.

If the headlight is in a high beam state, a determination is made whether light has been detected by a first sensor, mounted on a first portion of a first vehicle (1506). Notification of such light detection is made by the first light detection notification report made by FSDM 1204(1), and was described herein in relation to FIG. 13 as arriving at system controller 1316 via FSDM output signal 1206(1). The first sensor was described herein in relation to FIG. 2 as first sensor 106.

If light has not been detected by a first sensor, the headlight is placed, or maintained, in a high beam active state (1516), and the process begins (1502).

If light has been detected by a first sensor, a determination is made at the first vehicle whether the first light is unmodulated (1508), i.e., whether the first light contains an identifying signal. If so, the headlight state is adjusted to a low beam state, as described in relation to FIG. 3 (1514). The determination of first sensor light detection is accessed (1506), and the process proceeds.

If the first light is modulated, a determination is made whether the first light is modulated only with a first identifying signal of the first vehicle (1510), as described herein in relation to FIG. 2. Such a first identifying signal notification is made by the first identifying signal notification report made by FSDM 1204(1), and was described herein in relation to FIG. 13 as arriving at system controller 1316 via FSDM output signal 1206(1).

If the first light is modulated only with a first identifying signal of the first vehicle, the algorithm begins (1502). The headlight is thus maintained in the high beam state, as described herein in relation to FIG. 2.

If the first light is not modulated only with a first identifying signal of the first vehicle, a determination is made whether, independent of the first identifying signal, the identifying signals present in the first light, and identifying signals present in a second light, detected by a sensor mounted on a second portion of the first vehicle, are the same: I.e., independent of the first identifying signal, each identifying signal present in the first light is present in the second light and each identifying signal present in the second light is present in the first light (1512), as described herein in relation to FIG. 5. Notification of second light detection is made by the second light detection notification report made by SSDM 1204(2), and was described herein in relation to FIG. 13 as arriving at system controller 1316 via SSDM output signal 1206(2).

If the signals present in the lights are the same, the algorithm begins (1502). The headlight is thus maintained in the high beam state, as described herein in relation to FIG. 5.

If the signals present in the lights are not the same (i.e., independent of the first identifying signal, each identifying signal present in the first light is not present in the second light or each identifying signal present in the second light is not present in the first light), the headlight state is adjusted to a low beam state, as described in relation to FIG. 5 (1514). The determination of first sensor light detection is accessed (1506), and the process proceeds.

Figure 16:
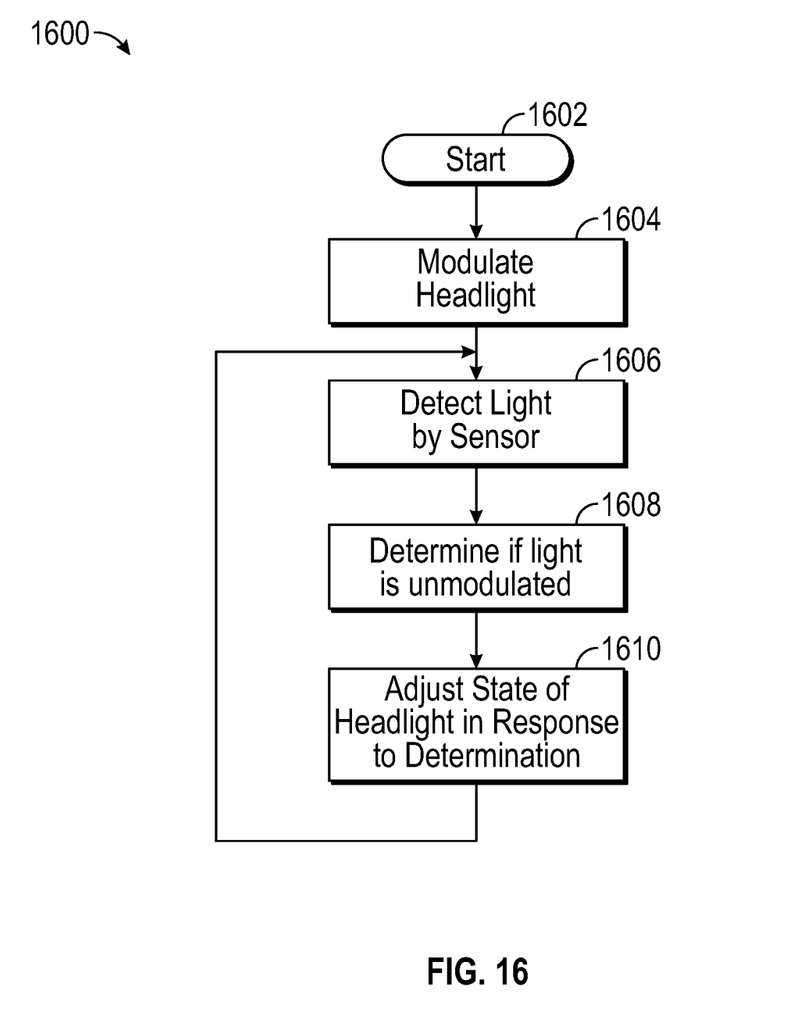
FIG. 16 illustrates a flowchart according to another embodiment.

FIG. 16 shows a flowchart 1600 according to an embodiment. The algorithm 1600 begins (1602).

A headlight is modulated (1604). The light contains a first identifying signal. This headlight was described in relation to FIG. 3 as headlight 304, shining modulated light 306.

A first light is detected by a sensor mounted on a first portion of a first vehicle (1606). The first light was described in relation to FIG. 3 as light 310, the sensor as front sensor 106, and the first vehicle as vehicle 102.

A determination is made at the first vehicle whether the first light is unmodulated (1608), i.e., whether it contains an identifying signal as described herein in relation to FIG. 3.

The headlight state is adjusted based on the determination (1610). As described in relation to FIG. 3, if light 310 is unmodulated, i.e., it has no vehicle ID encoded, or if light 310 is modulated, but with a vehicle ID different from that of vehicle 102, headlight 304 will change to a second state, a low beam state. Otherwise, headlight 304 will remain in a high beam state, shining modulated light 306.

A first light is detected by a sensor is accessed (1606) and the process proceeds.

The series of operations 1500 (FIG. 15) and 1600 (FIG. 16) may be stored on non-volatile memory or other suitable memory or computer-usable medium and in any suitable programming language.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present disclosure may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer, or other programmable apparatus to produce a computer-implemented process such that the instructions which execute on the computer or other programmable apparatus, provide processes for implementing the functions/acts specified in the flowchart and/or block diagram block or blocks.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the disclosure may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

It can be seen that the apparatus, system and methods presented herein provide an advancement in the state of the art.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method comprising:
   modulating at least a first headlight of a first vehicle with a signal based at least in part on a first identifying signal, the first identifying signal having a carrier frequency, the carrier frequency based, at least in part, on at least one of a random sequence and a pseudorandom sequence, to produce a modulated light signal;
   receiving light by at least one light sensor;
   generating at least one received signal from the received light;
   determining whether at least one of the first identifying signal and a second identifying signal of a second vehicle is present in the at least one received signal, the first identifying signal being present at the carrier frequency; and
   changing a beam state of the at least first headlight based at least in part on said determining.

2. The method of claim 1, further comprising:
   producing the first identifying signal of the first vehicle.

3. The method of claim 1, the first headlight further comprising a light-emitting diode (LED) source.

4. The method of claim 1, the first identifying signal and the second identifying signal each based at least in part on at least one of a random sequence and a pseudorandom sequence.

5. The method of claim 1, the modulated light signal being On-Off-Keying (OOK) modulated.

6. The method of claim 1, the changing a beam state of the headlight further comprising changing at least one of an amplitude, direction, and shape of a headlight beam associated with the headlight.

\* \* \* \* \*